(12) United States Patent
Weinmann et al.

(10) Patent No.: US 7,250,130 B2
(45) Date of Patent: Jul. 31, 2007

(54) METHOD AND INSPECTION DEVICE USED FOR THE CYCLIC PRODUCTION OF INJECTION MOLDED PARTS

(75) Inventors: Robert Weinmann, Weesen (CH); Daniel Jenny, Oberurnen (CH)

(73) Assignee: Netstal-Maschinen AG, Nafels (CH)

( * ) Notice: Subject to any disclaimer, the term of this patent is extended or adjusted under 35 U.S.C. 154(b) by 0 days.

(21) Appl. No.: 10/504,928

(22) PCT Filed: Jan. 29, 2003

(86) PCT No.: PCT/CH03/00072

§ 371 (c)(1),
(2), (4) Date: Feb. 15, 2005

(87) PCT Pub. No.: WO03/070448

PCT Pub. Date: Aug. 28, 2003

(65) Prior Publication Data
US 2005/0127571 A1 Jun. 16, 2005

(30) Foreign Application Priority Data
Feb. 20, 2002 (CH) .................................... 0293/02

(51) Int. Cl.
*B29C 45/42* (2006.01)
*B29C 45/76* (2006.01)
(52) U.S. Cl. ..................... 264/408; 264/40.1; 264/537; 425/165; 425/169

(58) Field of Classification Search ................ 264/408, 264/40.1, 40.6, 537, 538; 425/144, 169, 425/137, 165; 340/674; 250/223 R, 223 B
See application file for complete search history.

(56) References Cited

U.S. PATENT DOCUMENTS

| | | | | |
|---|---|---|---|---|
| 3,667,680 | A * | 6/1972 | Weed ..................... 239/265.17 |
| 4,187,267 | A * | 2/1980 | Fisher et al. ................ 264/40.1 |
| 4,603,329 | A * | 7/1986 | Bangerter et al. .......... 340/679 |
| RE33,237 | E * | 6/1990 | Delfer, III ................... 425/547 |
| 4,942,008 | A * | 7/1990 | Cahill .......................... 264/150 |
| 5,582,845 | A * | 12/1996 | Schad et al. ............. 425/126.1 |
| 6,315,543 | B1 * | 11/2001 | Lausenhammer et al. ... 425/139 |

* cited by examiner

*Primary Examiner*—Jill L. Heitbrink
(74) *Attorney, Agent, or Firm*—Finnegan, Henderson, Farabow, Garrett & Dunner, LLP

(57) ABSTRACT

The invention relates to a manufacturing inspection method for the cyclic production of injection-molded parts in multi-cavity casting molds involving a row-by-row monitoring of the injection-molded parts after they are removed from the casting molds, said monitoring being effected by sensors, particularly, photoelectric barriers. The invention also relates to an inspection device used during the cyclic production of injection-molded parts in multi-cavity casting molds involving a row-by-row monitoring of the injection-molded parts after they are removed from the casting molds, said monitoring being effected by sensors, particularly, photoelectric barriers.

14 Claims, 8 Drawing Sheets

Figure 1:
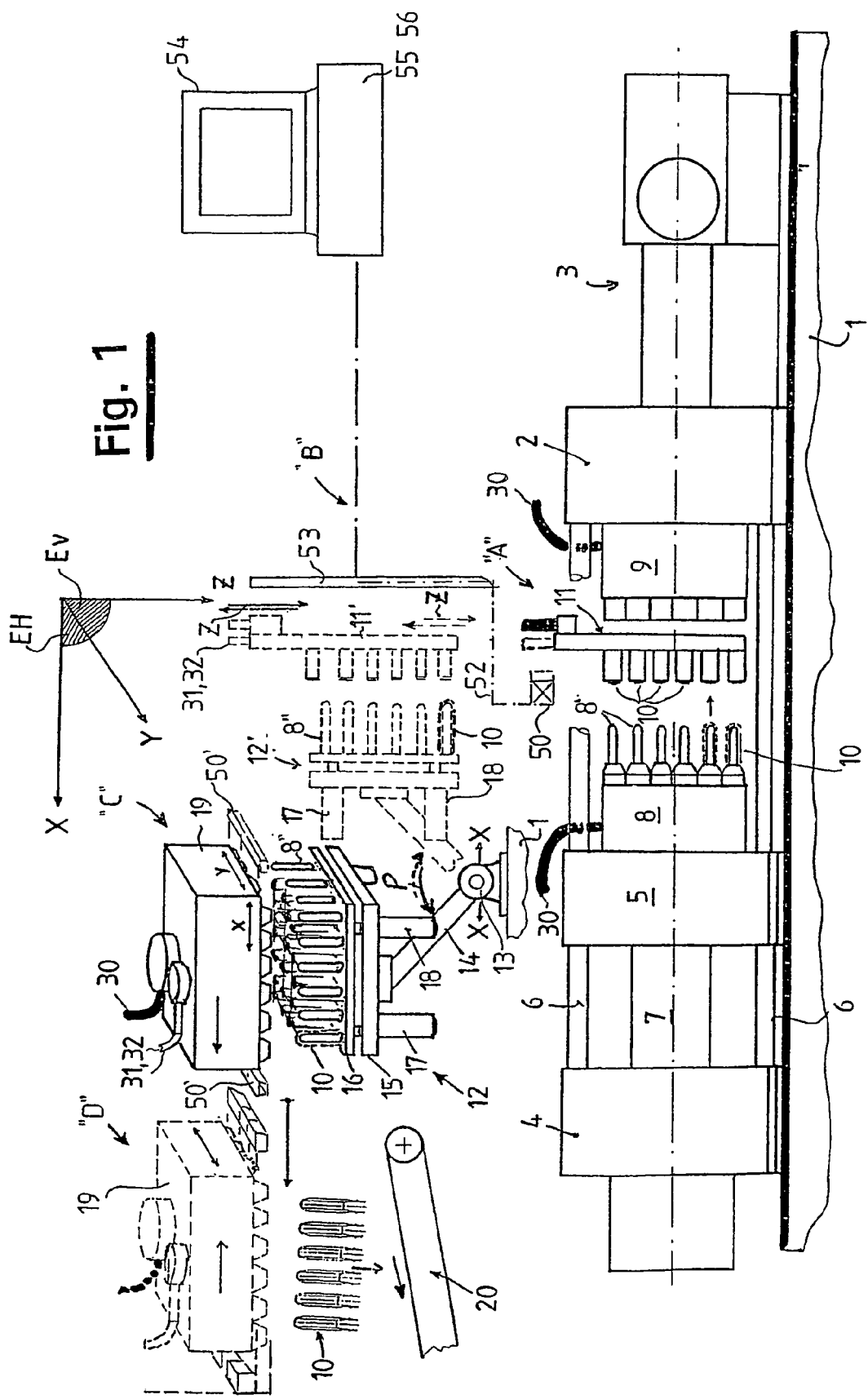

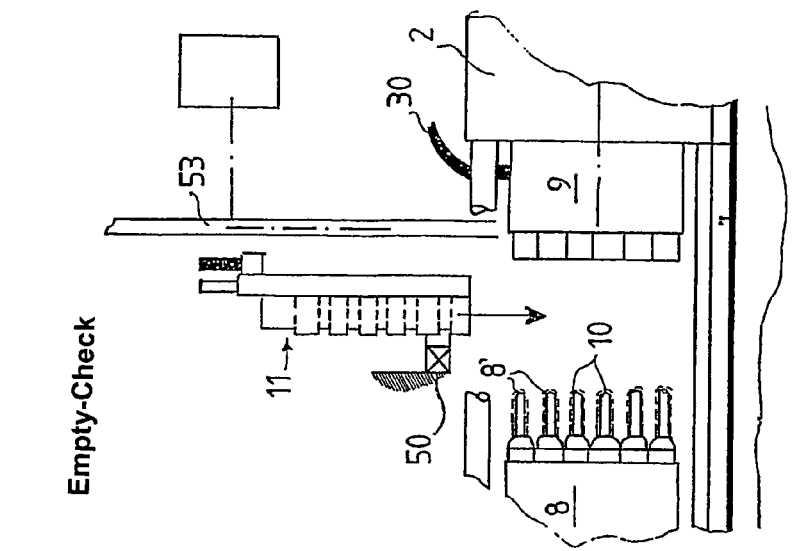
FIG 2a — Full-Check
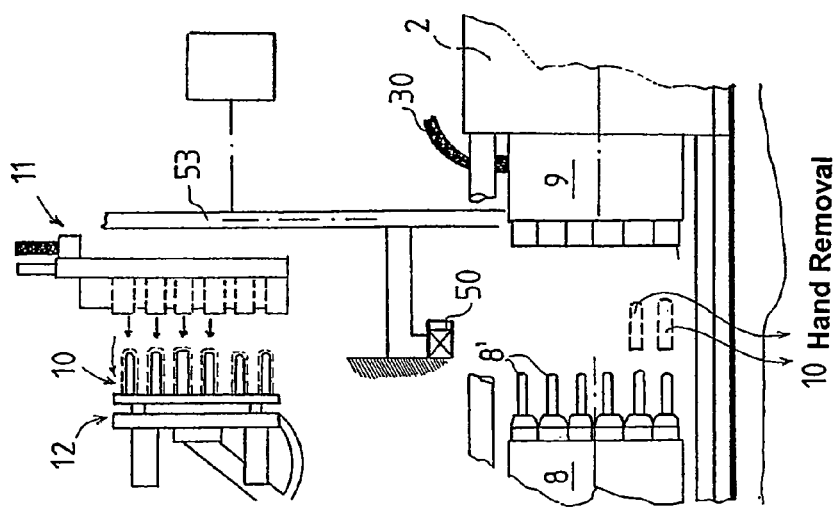
FIG 2b — Hand Removal
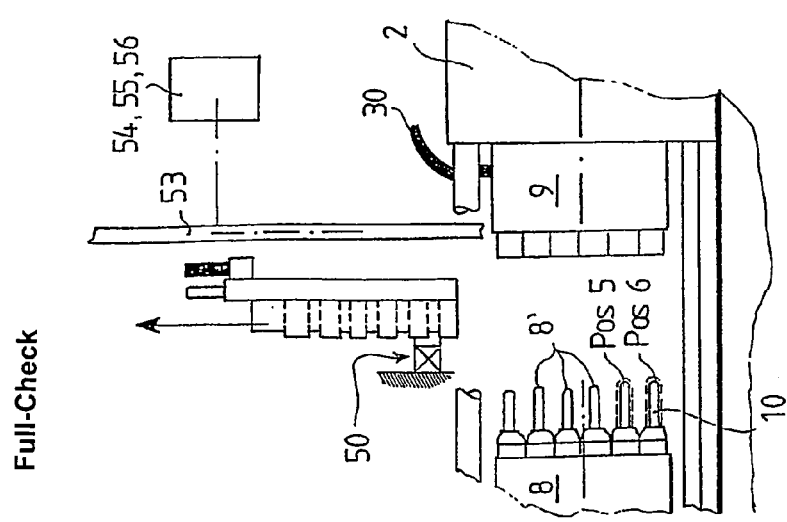
FIG 2c — Empty-Check

METHOD AND INSPECTION DEVICE USED FOR THE CYCLIC PRODUCTION OF INJECTION MOLDED PARTS

TECHNICAL AREA

The invention relates to a manufacturing inspection method for the cyclic production of injection-molded parts in multi-cavity casting molds involving a row-by-row monitoring of the injection-molded parts after they are removed from the casting molds, said monitoring being effected by sensors, particularly, photoelectric barriers. The invention also relates to an inspection device used during the cyclic production of injection-molded parts in multi-cavity casting molds involving a row-by-row monitoring of the injection-molded parts after they are removed from the casting molds, said monitoring being effected by sensors, particularly, photoelectric barriers.

THE CURRENT ART

A distinction is made in injection molding between two different areas of application for multiple molding. A first application is the production of relatively thin-walled parts. Such parts are cooled in the mold after completion of the actual injection-molding process until they have been brought into a stable condition and can be ejected and packaged after the halves of the mold are separated.

A second application can be illustrated with the production of PET (polyethylene terephthalate) objects. PET objects are thick-walled injection-molded parts. The wall thickness must be thick enough so that there is sufficient wall material for a subsequent blow process with associated significant increase in volume. A PET bottle must retain sufficient wall thickness after the blow process. The thick walls of the injection-molded parts have a major disadvantage for the molding process; the cooling time is two to four times greater than the molding time itself. If the preform must remain in the mold until it has cooled sufficiently, then the throughput of the entire injection-molding machine is correspondingly reduced. In practice the productivity of the machine is kept at high efficiency by having only the first portion of the cooling of the injection-molded part take place within the mold in such a way that the injection-molded part can be removed from the mold without damage and allowed to cool subsequently. Injection molds are designed for the production of 50 to 200 preforms per cycle. The corresponding number of injection-molded parts are removed by robotic equipment while still hot and these are placed directly into a post-cooler or transferred by means of a special removal device from the mold to a post-cooler. In the interests of efficient production, each step in the process is carried out in the shortest possible time. Nevertheless, the removal and transfer of the individual parts is not entirely without its problems. For various reasons an individual part can remain caught in the cooling cavity of the transfer device or in the post-cooler. If an injection-molded part is stuck in the mold half, this can damage the mold when it closes. The same is true for both the removal device and the post-cooler. For the sake of efficiency both the mold cavities and the cooling positions are arranged in rows.

In the current art at least the removal of the injection-molded parts from the molds is monitored by means of photoelectric sensors. A beam of light is passed across an entire row of preforms to determine whether any injection-molded parts are still within a mold-half or whether all preforms have actually been removed from the mold. If even a single preform remains on the positive mold-half, the light beam does not reach the detector. This immediately causes an error signal and the closure of the mold is stopped. Generally the individual preforms are removed by hand and the injection process is started up again. It is understandable that with the increasing number of mold cavities in the tooling and the corresponding number of injection-molded parts per molding cycle, the requirements for process control are increasing. The concept of post-cooling and the extra handling steps involved multiplies the possibilities for error.

The object of the invention is to develop a means of monitoring as well as a monitoring device for protection of the tooling that recognizes, in real time if possible, errors in the process of transferring injection-molded parts in association with the molding process and thereby permits these errors to be corrected without consequent damages.

PRESENTATION OF THE INVENTION

The procedure according to the invention is characterized in that for each row a sensor is fixedly disposed in such a way that the injection-molded parts in are presented to that sensor, particularly in that they are individually moved past that sensor.

The device according to the invention is characterized in that for each row at least one fixedly disposed sensor is disposed in such a way that the injection-molded parts obligatorily are presented to the sensor, particularly in that they move past the sensor for a check of a full and/or empty situation at each position of the row.

The inventors are aware that, particularly in cases of protection of tooling, motion of the injection-molded parts relative to the sensors offers multiple advantages. Primarily it is the reliability of the monitoring that is increased. It is easier to obtain an unambiguous signal if presence or non-presence can be determined with a motion. Row-by-row monitoring of injection-molded parts is known in the current state of the art. The associated sensors are fastened to the molds. Each sensor monitors an entire row of positive molds and ensures that the molds cannot be closed when one or more molded parts remain on the positive mold after removal.

The new solution suggests that in cases of tooling protection, each injection-molded part move past the sensor individually. This has the major advantage that if the process control is computerized, the injection-molded parts can be counted. For each injection-molding cycle, the predicted quantity of injection-molded parts can be given and the actual number can then be determined for each removal and the determination made of empty and full conditions at the removal means. This opens entirely new possibilities. Monitoring of process steps following removal of the injection-molded parts can be provided with means of displaying all of the injection-molded positions being monitored so that empty molds or the retention of one or more injection-molded parts can be determined, advantageously with the indication of position. In the processing of PET molds it is common practice to continue with production even though problems exist with one or more mold cavities. The supply of melt to the affected cavities is stopped. The new solution has the enormous advantage that even this operation is still positively monitored. The applicable data can be stored in the memory of the computer and continually modified. Safety in production is here again maintained completely. Preferably the sensors are disposed in proximity to the injection-molding molds to ensure the quickest possible accomplishment of a safety intervention in the process control.

The new solution permits monitoring of the injection-molded parts in either the device for removal from the injection molds and/or in the post-cooler. In the event that the injection-molded parts are preforms, then the process control is carried out in proximity to the post-cooler. Each preform is pressed into the cavity of the removal device and/or post-cooler far enough so that essentially only the threaded portion protrudes from the cavity. The threaded portions are monitored by the sensors and because of the significant size of the threaded portions, this permits a high degree of reliability of signal capture. Because the plastic materials of the preforms are more or less transparent, there exist some preferred sensor techniques.

The new solution further permits a large number of particularly advantageous structural designs. Each sensor is preferably designed as a split optical switch such that each injection-molded part must pass through the gap of a sensor. In the case of PET molding, the threaded portion passes through the gap in the split optical switch. Preferably all sensors are disposed in a single plane on a common carrier bar, which is disposed perpendicular to the direction of motion of the injection-molded parts and in proximity to the injection molds. The common carrier bar is fixedly disposed with reference to the removal device. Row-by-row monitoring is sufficient for monitoring the post-cooler. There the post-cooler moves relative to the sensors in such a way that the rows that have been cleared are the rows that are monitored.

The monitoring device can include visualization means for the display of contingent errors relative to an empty condition or to a discrepancy between the predicted full condition and the actual condition. In the event of repetitive errors, this permits exact localization and rapid goal-oriented correctional measures to be taken with regard to either restricted operation or mechanical correction of the error.

BRIEF DESCRIPTION OF THE INVENTION

Figure 3:
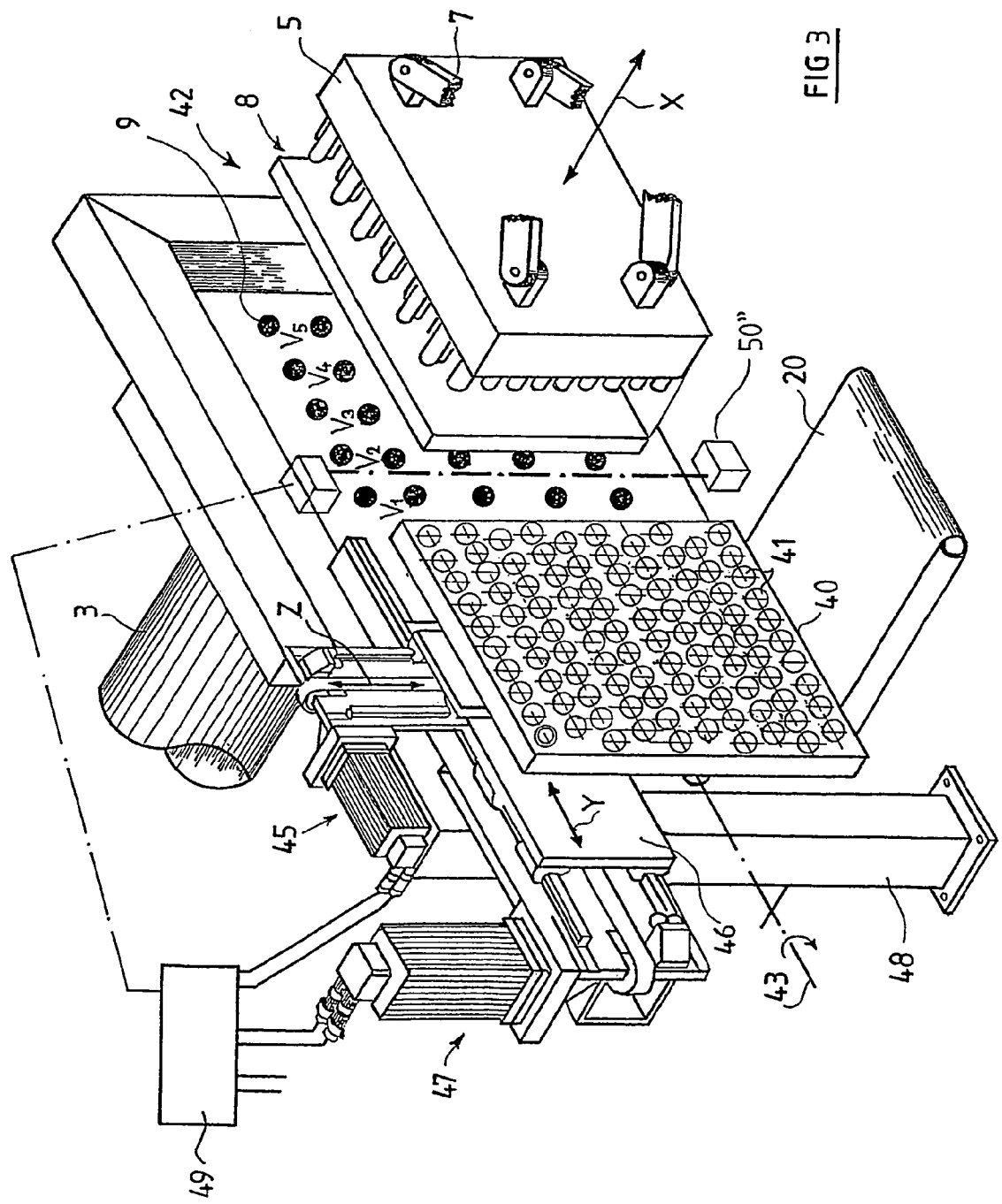
Figure 4:
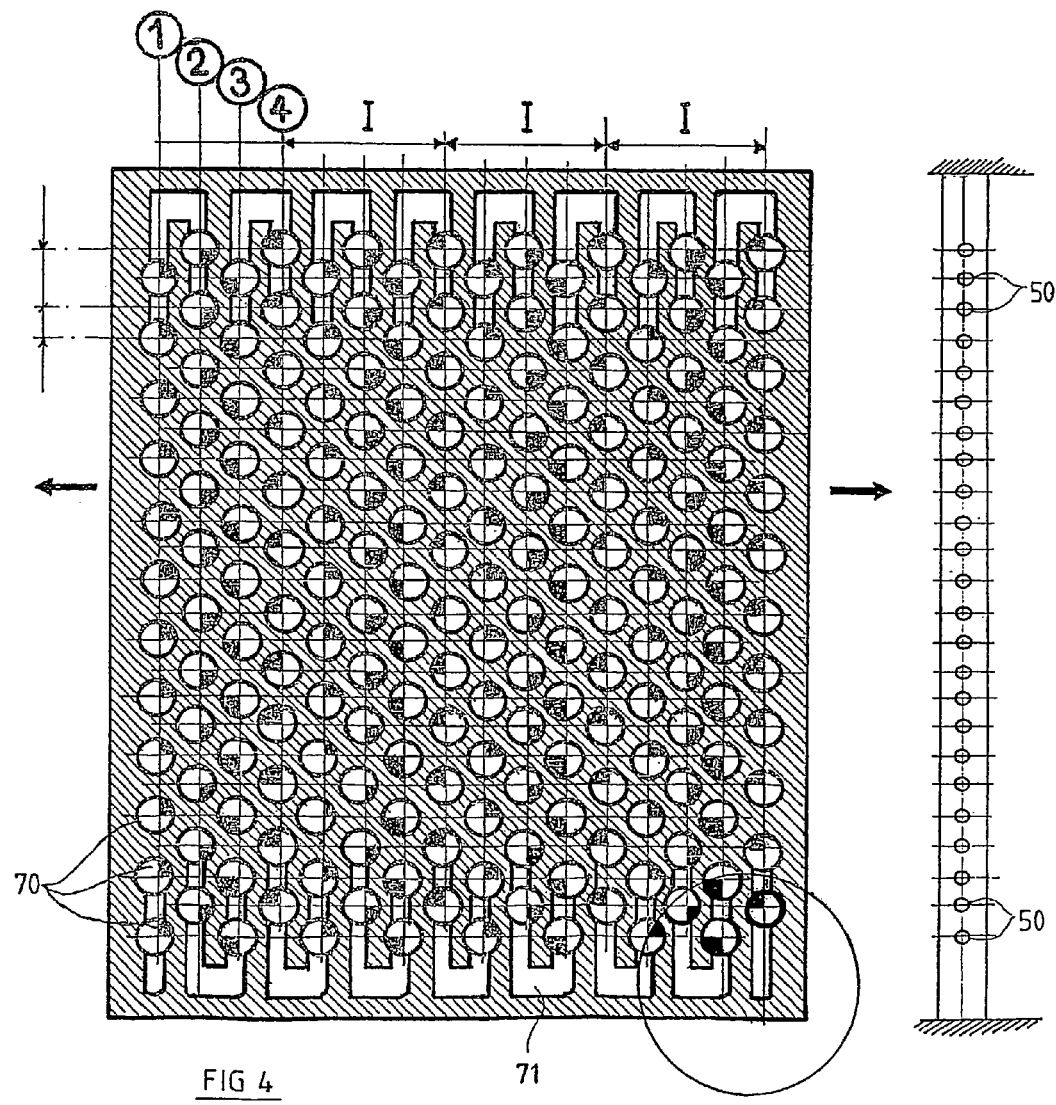
Figure 5:
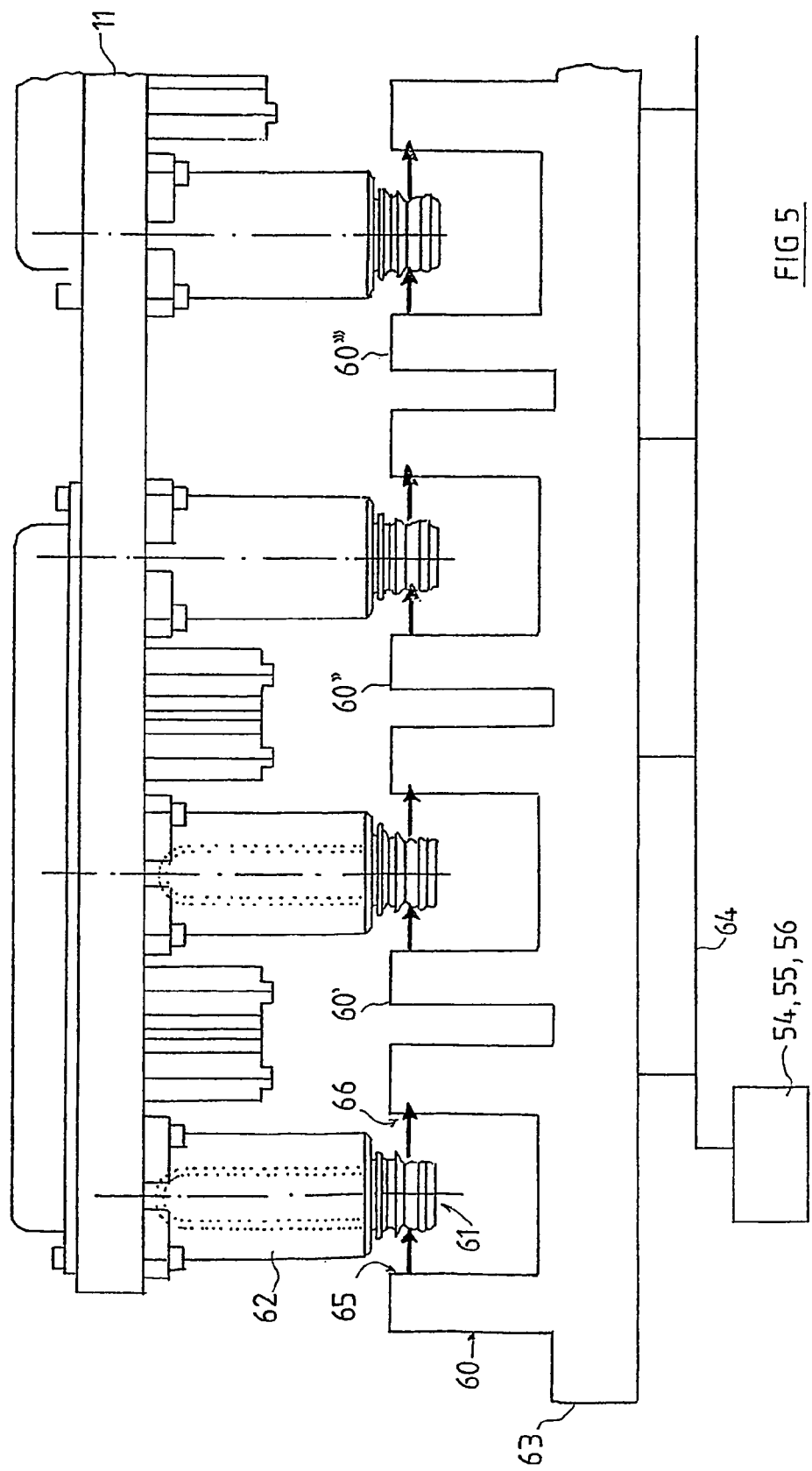
Figure 6:
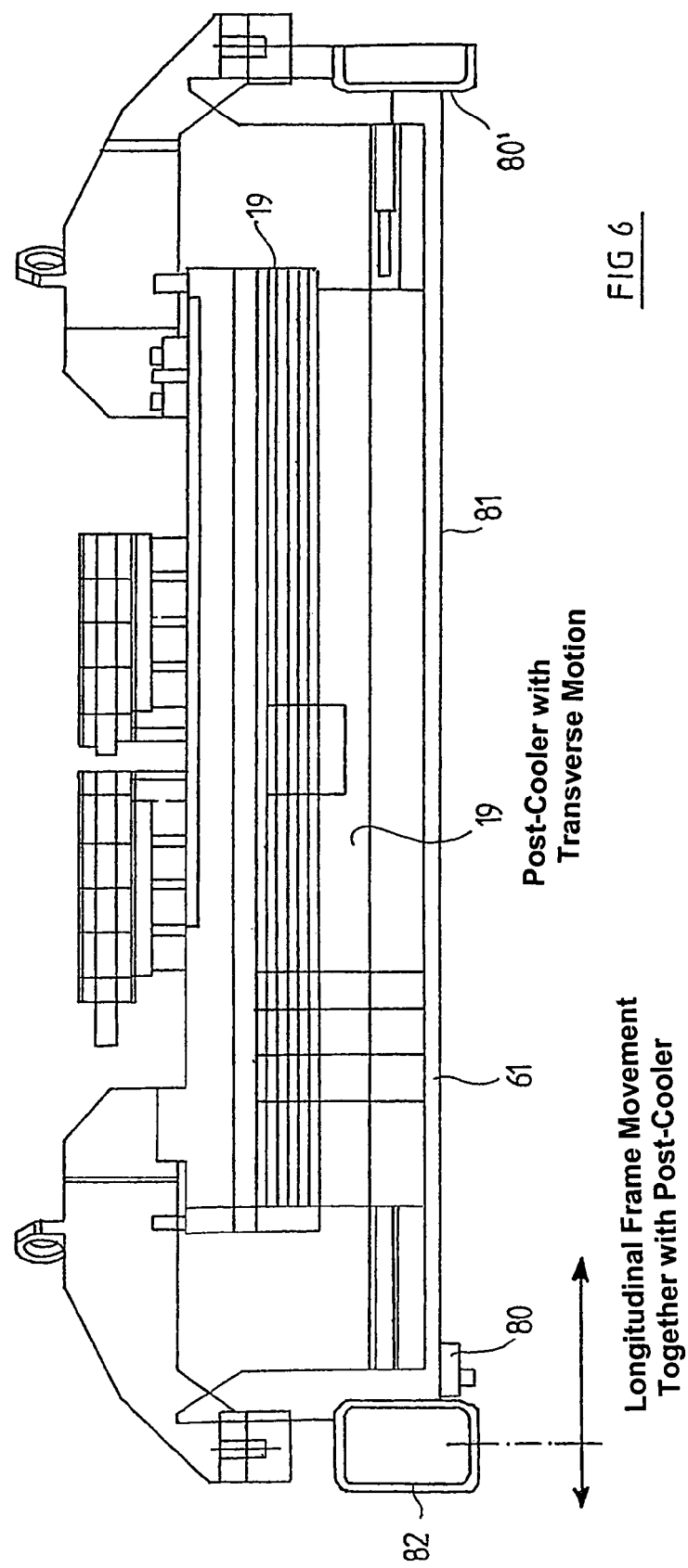
Figure 7:
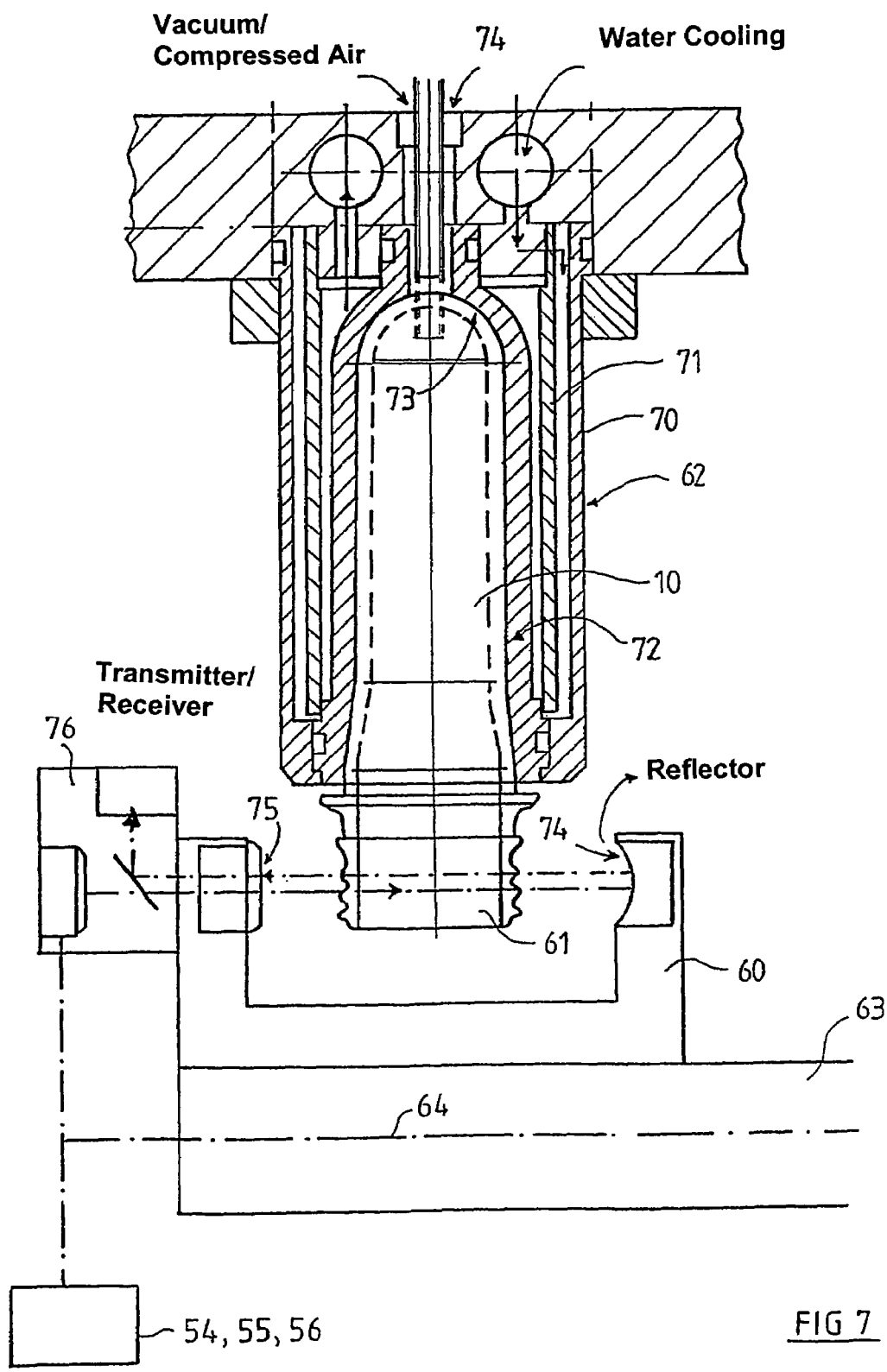
Figure 8:
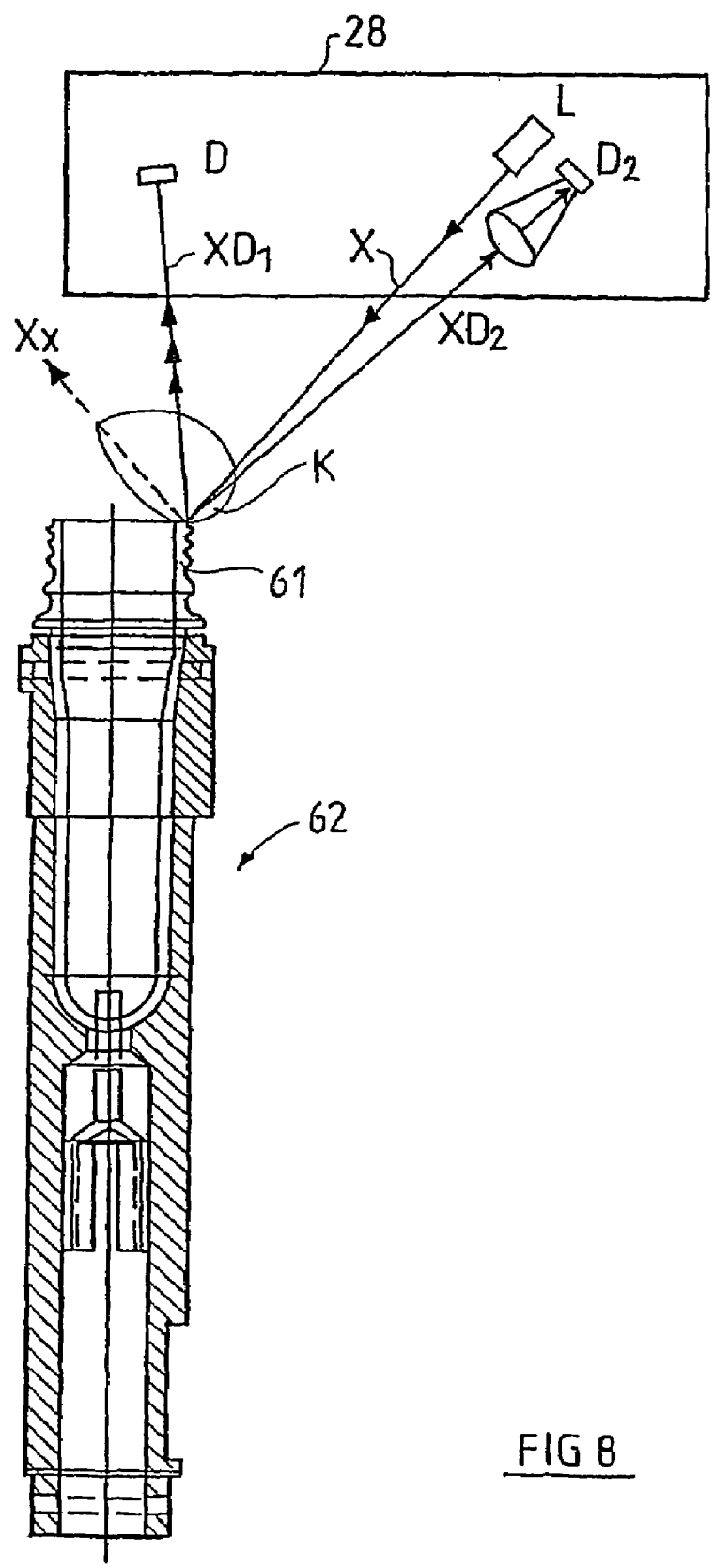

The invention will now be explained in more detail with the aid of an embodiment example. This shows:

FIG. 1. A schematic overview of a production unit for the manufacture of PET moldings;

FIGS. 2a, 2b and 2c. Various states of the removal device;

FIG. 3. An example of a robotic removal device for multi-cavity molds for the production of injection-molded parts;

FIG. 4. An example of the offset arrangement of the cooling positions in the post-cooler;

FIG. 5. An embodiment example of a split optical switch unit on a common carrier bar;

FIG. 6. Ejection monitoring from a post-cooler which is being moved with the preforms relative to the photoelectric barrier;

FIG. 7. A single cooling cavity with a split-switch unit at larger scale using the reflection principle;

FIG. 8. A further example of a sensor with a laser, microwave or infrared beam as an edge sensor.

APPROACHES AND IMPLEMENTATION OF THE INVENTION

In the following, reference will be made to FIG. 1. FIG. 1 shows schematically a primary preferred design for a production unit for PET moldings. FIG. 1 shows an entire injection-molding machine with a machine bed 1, upon which a fixed mold mounting plate 2 and an injection unit 3 are attached. An end backup plate 4 and a movable mold mounting plate 5 are supported and are axially displaceable on the machine bed 1. The two fixed plates 2 and 4 are connected by means of four rods 6 which extend through the movable mold mounting plate 5. Between the backup plate 4 and the movable mold mounting plate 5 is a drive unit 7 to provide the closing force. The fixed mold mounting plate 2 and the movable mold mounting plate 5 each carry a mold half 8 and 9 in which a plurality of mold cavities are formed in order to provide a suitable number of hollow injection-molded parts. The part molds 8' are illustrated as rods, to which the hollow injection-molded parts adhere immediately after the opening of the mold halves 8 and 9 and are thereafter ejected. At this time the injection-molded parts 10 are already in a semi-hardened condition and are indicated by dotted lines. The same injection-molded parts 10 in a completely cooled condition are shown at the upper left of FIG. 1, where they are just being ejected from a post-cooling device 19. The upper rod 6 is illustrated as broken in order to better show the details between the opened halves of the mold. The four most significant phases in the handling of the injection-molded parts after completion of the injection process in accordance with the invention of FIG. 1 are:

"A" is the removal of the injection-molded parts or preforms 10 from the two halves of the mold. The semi-hardened parts are picked up by a removal device 11 that is lowered into the space between the two opened halves of the mold (Position "A") and lifted by this device into Position "B" (pickup device 11' in FIG. 1).

"B" is the transfer position of the removal device 11 with the preforms 10 to a transfer carrier 12.

"C" is the transfer of the preforms 10 from the transfer carrier 12 to a post-cooling device 19.

"D" is the row-by-row ejection of the cooled and stabilized preforms from the post-cooling device 19.

FIG. 1 shows a snapshot, so to speak, of the four main steps in handling. In Position "B" the vertically arrayed injection-molded parts 10 are taken by the transfer carrier 12 and 12' and swung by the transfer device in the direction of the arrow P into an upright position as shown in phase "C". Transfer carrier 12 consists of a supporting arm 14 that swings about an axis 13 and that carries a holder plate 15 to which a carrier plate 16 for centering rods 8" is disposed in parallel with some separation. Carrier plate 16 is adjustably parallel to holder plate 15 so that the hollow injection-molded parts 10 can be extracted from the removal device 11 and then swung into position "C" so that they can be inserted into the post-cooling device 19 which is positioned above them. This transfer takes place by enlarging the distance between holder plate 15 and carrier plate 16. The still semi-solid injection-molded parts 10 are completely cooled down in the post-cooling device 19 and after the post-cooling device 19 has been moved into Position "D" they are ejected and dropped onto a conveyor belt 20. The label 30 is the water cooling with associated inlet and outlet tubing, which are indicated by arrows for simplicity and are assumed to be known. The label 31/32 indicates the air side, where 31 represents the air inlet for inflation and compressed air and 32 represents the vacuum and exhaust line.

In FIG. 1 the horizontal plane is designated EH and the vertical plane EV. The horizontal plane EH is defined by the two coordinates X and Y and the vertical plane by the coordinates Y and Z. The Z-coordinate is vertical and the X-axis is perpendicular to it. The motion of the individual devices and the automation is only schematically indicated by arrows. FIG. 1 represents a possible basic arrangement, one that can be implemented in a great number of variations in accordance with the new invention: the transfer carrier 12 makes a swinging motion as well as a linear motion in the X-coordinate. The transfer carrier 12 can also be designed to make a controlled motion in the Y-coordinate. Because the transfer carrier already has a controlled motion in the X-coordinate, an exact positioning of the preforms present on the holder rods on the transfer carrier can be made in the X-direction by means of closed or open-loop control of the motion. For the transfer of the preforms to the post-cooler 19, in this example the post-cooler 19 is moved into a fixed position in the X-direction and the transfer carrier is moved in the Y-direction by means of closed or open-loop control into the desired position. In the preferred embodiment, the means of motion for the post-cooler 19 in the two coordinates X and Y for exact positioning for the ejection and for the transfer of the preforms are under closed or open-loop control. Thus the post-cooler 19 and the transport carrier 12 are each moved into a defined position.

FIG. 1 shows two locations for a final inspection:

the area in which the preforms are removed from the injection molds with split-switch units 50 to provide protection for the tooling.

The post-cooling area with a photoelectric barrier 50' for ejection monitoring.

In both cases the process is carried out by preprogrammed or controlled mechanical means. The beginning of each working cycle must be clearly defined.

Before the mold halves are closed, it must be assured that there are no individual injection-molded forms 10 stuck in the tooling from the previous cycle. From the point of view of tooling protection, the most important safeguard is that, in the event of an irregularity, either the process is halted or at least the next closing of the tooling is prevented. This can involve either not initiating the closing process or, if necessary, that the closing be halted during the closing process.

Before the removal device 11 is returned to the space between the open mold halves 8 and 9, it must be determined that the space is completely empty.

Before loading the post-cooler 19 following ejection of the completed parts, it must be ensured that no individual preforms 10 are stuck in any of the positions.

Considering the importance of monitoring the finished product, the most important tasks are tooling protection and monitoring the multi-cavity molds 8 and 9. A monitoring device 50 is permanently installed in proximity to the two mold halves 8 and 9 and connected by a support 53 to the removal device 11, as indicated by the auxiliary line 52. A second possibility for applying the new invention is in the area of the post-cooler 19. The associated monitoring device is designated as 50'. Means of visualization are indicated at 54 and the memory and computer are shown as 55, 56.

FIGS. 2a, 2b and 2c show schematically three different installations for the removal device 11. In FIG. 2a, for instance, only the top four preforms have actually been picked up by the removal device 11. The removal device 11 passes through the split switch unit 50 with the protruding preforms 10. After the removal device 11 has passed entirely through the split switch unit 50, it determines that the preforms from position 5 and position 6 are missing in that particular row and consequently are still stuck in the mold half. An immediate stop order is practically instantly triggered for the machine via computing means 55, 56. The two mold halves 8 and 9 cannot close again. An alarm is sounded so that the operator of the machine can remove the two preforms at position 5 and position 6 by hand and the process can start again. There is a second possibility that the two mold cavities were not actually active. The two preforms at position 5 and position 6 were not injected. There is the possibility that this was programmed into the recipe memory 56. During processing in this case, it would now be established that the two preforms in position 5 and position 6 were simply not produced. Production could then continue with the least possible amount of time lost.

FIG. 2b shows the situation for a transfer from the removal device 11 to the post-cooler 19 via a transfer carrier 12 (FIG. 1). Here again there is the possibility of an error. One or even more preforms could become stuck in their cavities in the removal device 11. This would mean that at the next pickup of hot preforms from the mold halves 8, 9, two preforms would collide, with possibly major resultant damage to the tooling.

FIG. 2c shows the empty-check. The removal device 11 traverses through the photoelectric barrier from top to bottom with some preforms 10 possibly stuck inside. Any stuck preforms would be detected and the process immediately interrupted until any stuck preforms have been removed by hand.

FIG. 3 shows a post-cooler concept in a compact design. The invention as shown in FIG. 1 still applies to the injection-molding machine. A post-cooler 40 with a plurality of cooling cavities 10 occupies a vertical transfer plane, that is, a plane within the Y and Z coordinates. In the position shown, the 22 mold halves 8 and 9 are in the open position, so that the post-cooler 40 can be introduced into and removed from the empty space 42 between the mold halves. The post-cooler 40 has a total of three degrees of freedom: a horizontal axis of motion in the Y coordinate, a vertical axis of motion in the Z coordinates and an axis of rotation 43. The axis of rotation 43 serves only for the ejection of the cooled preforms onto a conveyor belt 20. This will not be discussed further. The axis of rotation 43 is attached by bearings to support 48 and exhibits a vertical drive 45. Vertical drive 45 is slidably disposed on a carrier plate 46 associated with a horizontal drive 47.

Also in FIG. 3 is the monitoring device 50" as well as sensors in proximity to the injection molds. The injection mold cavities are disposed in equally spaced vertical rows V1, V2, V3, V4, etc. Monitoring device 50" is fixedly attached to the machine frame. Instead of using a removal device, the preforms are here inserted directly into a post-cooler 40. In the example shown, the cooling positions are disposed in offset rows, in such a way that the post-cooler can accommodate three or four times the quantity produced in an injection cycle. In computer/memory means 49, an image of the injection and the cooling positions is established so that in the event of an error the exact position of the problem can be determined.

The post-cooler equipment shown in FIG. 4 exhibits several parallel rows ①, ②, ③, ④, In the example shown there are 12 cooling cavities 70 in each row, each of which accepts one preform 10. The cooling cavities 70 can be disposed much more closely together than the cavities in the injection molds. For this reason there are not only more parallel rows but the rows are also advantageously offset as expressed in the their X and Y dimensions. This means that for the first injection cycle the holes are labeled ①, for a second injection cycle the holes with number ②, etc. If in the example with four parallel rows, all the rows with number ④ are filled, the rows with number ①, as described, are being prepared for ejection onto the conveyor belt 20. The remainder proceed in this manner during the entire production run. In the example shown the total post-cooling time is on the order of three or four times the injection time. The cooling Channel 21 for the water cooling must be optimally designed so that the water cooling takes place as uniformly and as efficiently as possible for all cooling tubes. In addition, the compressed air and vacuum provisions in the post-cooling device must be controllable row-by-row so that at some particular time all rows ①  or ②, etc. can be activated simultaneously.

FIG. 4 shows an offset arrangement of the rows, corresponding to FIG. 3. It is important in any case to consider the motion of the post-cooler with the preforms 10 relative to the sensors 50, which are advantageously fixed in position. With a corresponding image of the cooling positions as well as the mold cavity positions, any error can quickly be associated with a position by means of the memory/computer means, and the required control commands to can be issued.

FIG. 5 shows a preferred design with a plurality of split-switch barriers 60, 60', 60", etc. for tooling protection which are fastened to a common carrier bar 63. The threaded portion 61 extends out of the cooling cavities 62 and moves perpendicularly to the plane of the drawing in FIG. 5. Each sensor or each photoelectric barrier is connected to the computer/memory 54, 55, 56 by means of a signal conductor 64. FIG. 5 is the application at the removal of the injection-molded parts from the mold cavities, in which it is desired to count the parts produced. Each photoelectric barrier has a transmitting component 65 as well as a receiving component 66. If a threaded portion passes through the gap of the split-switch barrier, a suitable signal is produced.

FIG. 6 shows the application of a photoelectric barrier 80, 80' at a stand-alone post-cooler 19. Here the object is to monitor with a light beam 81 the complete ejection of all injection-molded parts after completion of the post-cooling. Counting is not necessary here. The post-cooler 19 moves perpendicularly to the plane of the drawing into either the pickup or the ejection position as desired. The photoelectric barriers are fixedly attached to a longitudinally movable frame 82. In the solution in accordance with FIG. 6, the preforms move through the light beam row by row. In a further embodiment, the transfer carrier may be subjected to photoelectric-barrier monitoring in the form of a split-switch unit or with transmitted light or a light beam 81 for an entire row. [Legends on FIG. 6: Longitudinal frame movement together with post-cooler; Post-cooler with transverse motion]

FIG. 7 shows a preferred embodiment of a cooling cavity 62. Cooling cavity 62 consists of a double-shell cooler 70, 71 and an inner cooling cavity 72. The inner cooling cavity 72 has an internal contour that closely fits the exterior shape of the injection-molded part. Particularly interesting in this respect is the rod-shaped component 73. The preform lies snugly within the curved shape of the interior of the cooling cavity. The cooling cavity 72 exhibits a relatively thin constant wall thickness up into the dome region. In this way the cooling conditions, particularly the heat flux through the total area of the preform which is enveloped by the cooling cavity, are optimized. At the peak of the dome is an air connection 74 through which either compressed air (for ejection) or vacuum (to suck the preform up into contact with the dome) can be provided. It can further be seen from FIG. 7 that the entire threaded portion G extends out from the cooling cavity and is usable for sensor monitoring. FIG. 7 schematically shows the application of a photoelectric sensor with a reflector 74. The reflector sends the light beam back to the transmitter. By means of a suitable mirror device in the sensor device 76, the signal is processed and conducted through a signal conductor 64 to the monitoring device 54, 55, 56. [Legends on FIG. 7: Vacuum/compressed air; Water cooling; Transmitter/receiver; Reflector]

FIG. 8 shows a further embodiment of the sensor that is designed as an image sensor. In this way laser, microwave or infrared radiation can be used. FIG. 8 shows a laser sensor based on optical edge-recognition. The edges of the injection-molded part are most easily recognized when they are passed through the laser beam. A laser diode with focusing optics (L) produces a highly visible tiny point of red light on the forward surface of the sensor device 28. The laser beam (X) strikes the surface obliquely. In accordance with light scattering theory, the major portion of the light is reflected in the direction (Xx). Detector D1 then receives more light (XD1) than detector 2 (XD2). If the laser beam encounters an edge, precisely the opposite is the case. D2 receives more light than D1. The compact device, thanks to its well-focused laser beam, detects even the smallest edge. A built-in microcontroller suppresses undesired multiple pulses by switching the device into an inactive state during a dead-time following each detected upper edge. Various programs guarantee an optimal adaptation to all counting problems:

Fixed dead-time: settable in milliseconds

Dynamic dead-time: the microcontroller continually monitors the pulse train and eliminates multiple pulses even with a varying conveyor speed since the dead-time is dynamically adapted to the pulse train.

Synchronization with machine rate: synchronization with the machine rate by means of a synchronizing input (from a tachometer, for example). In this way the dead zone corresponds to a defined distance, completely independent of conveyor speed.

The invention claimed is:

1. Method for monitoring output in the cyclic and process-controlled production of injection-molded PET moldings in multi-cavity casting molds with row-by-row disposition of the injection-molded PET moldings by monitoring the handling of the injection-molded PET moldings in cooling cavities following removal of the PET moldings from the injection molds by sensors including photoelectric barriers in order to recognize an error,
    wherein the error includes either the absence of the injection-molded PET moldings or the retention of the injection molded PET moldings,
    wherein in case of the error a safety intervention is initiated,
    wherein the injection-molded PET moldings are introduced into the cooling cavities such that a threaded portion of the injection-molded PET moldings extends out of the cooling cavities,
    wherein the inspection takes place row by row by the sensors located fixedly in respect and in proximity to the injection molds,
    wherein the sensors are fixedly disposed for each row of injection-molded parts such that each of the injection-molded parts is moved past the sensors,
    wherein the cooling cavities and the threaded portion are moved to and past the sensors in order to recognize errors.

2. Method for monitoring output in the cyclic and process-controlled production of injection-molded PET moldings in multi-cavity casting molds with row-by-row disposition of the injection-molded PET moldings by monitoring the handling of the injection-molded PET moldings in cooling cavities of a post-cooler following removal from the injection molds by sensors including photoelectric barriers in order to recognize an error, wherein an inspection is carried out following a filling and an emptying of the cooling cavities of the post-cooler, wherein the inspection takes place row by row by the fixedly disposed sensors located in proximity to the post-cooler, wherein the injection-molded PET moldings are introduced into the cooling cavities of the post-cooler such that the threaded portion of the injection molded PET moldings extend out of the cooling cavities, wherein the sensors are fixedly disposed for each row of injection-molded PET moldings such that each of the injection molded PET moldings is moved past the sensors, wherein the inspection takes place row by row by the sensors with respect to the cooling cavities and the threaded portions so as to recognize the error, wherein the cooling cavities and the threaded portions are moved to and past the sensors in order to recognize the error, wherein the error includes either the absence of the injection-molded PET moldings or the retention of the injection molded PET moldings, wherein the case of an irregularity a safety intervention is initiated.

3. Method in accordance with claim 1 or 2, wherein a computer is associated with an output monitor for monitoring the handling of the injection-molded PET moldings, wherein a counting of the injection-molded PET moldings is performed, wherein for each injection cycle a desired quantity of injection-molded PET moldings is introduced into the cooling cavities and an actual quantity of injection-molded parts is determined by the sensors during each removal.

4. Method in accordance with claim 1 or 2, wherein the monitoring of the handling following removal of the injection-molded PET moldings from the cooling cavities includes means for imaging all of the injection-molded PET moldings positions to be monitored and either the absence of one or more injection-molded PET moldings or the undesired presence of one or more injection-molded PET moldings is determined, wherein an intervention in the handling process is undertaken.

5. Method in accordance with claim 1 or 2, wherein the injection-molded PET moldings are preforms and a final inspection is carried out in proximity to at least one of the post-cooler and the injection molds, wherein each preform is pressed deeply enough into the cooling cavity of a removal device of the post-cooler so that only the threaded portion protrudes from the cooling cavity, wherein the cooling cavity is monitored by the sensors.

6. Monitoring device for the cyclic and process-controlled production of injection-molded PET moldings in multi-cavity casting molds with row-by-row disposition of the injection-molded PET moldings by monitoring the handling of the injection-molded PET moldings following removal from the injection molds and cooling cavities in a post-cooler by sensors including photoelectric barriers in order to recognize an error, wherein the injection-molded PET moldings are introduced into the cooling cavities such that a threaded portion of the injection-molded PET moldings extends out of the cooling cavities;

wherein an inspection is carried out following a filling and an emptying of the cooling cavities of the post-cooler and takes place row by row by the fixedly disposed sensors located in proximity to the post-cooler, wherein the sensors are fixedly disposed for each row of injection-molded PET moldings such that each of the injection-molded PET moldings is moved past the sensors, wherein the inspection takes place by the sensors with respect to the cooling cavities and the threaded portions so as to recognize the error, wherein the cooling cavities and the threaded portions are moved to and past the sensors in order to recognize the error, wherein in the case of an irregularity a safety intervention is initiated.

7. Monitoring device in accordance with claim 6, wherein each sensor is a photoelectric barrier including a split-switch unit, wherein each injection-molded PET molding must pass through a gap of at least one sensor.

8. Monitoring device in accordance with claim 6, wherein all of the sensors are disposed in one plane on a common bar, which wherein the common bar is disposed perpendicularly to a direction of motion of the injection-molded PET moldings and is in proximity to the injection mold.

9. Monitoring device in accordance with claim 8, wherein the common bar is fixedly disposed relative to the removal device.

10. Monitoring device in accordance with claim 6, further comprising means for visually displaying any recognized errors concerning an absence or retention of an injection molded PET molding.

11. Monitoring device in accordance with claim 6 or 10, further comprising a computing means for counting the injection-molded PET moldings and for recognizing the error indicating the absence of the injection-molded PET molding and the retention of the injection molded PET molding.

12. Monitoring device in accordance with claim 6, wherein each sensor including a split-switch unit is configured to check for a threaded portion of the PET moldings.

13. Monitoring device in accordance with claim 8, further comprising a means for visually displaying any recognized errors concerning the absence or the retention of the injection-molded PET molding.

14. Monitoring device for the cyclic and process-controlled production of injection-molded PET moldings in multi-cavity casting mold with row-by-row disposition of the injection-molded PET moldings by monitoring the handling of the injection-molded PET moldings following removal from the injection molds and cooling cavities in a post-cooler by the sensors including photoelectric barriers in order to recognize an error, wherein the injection-molded PET moldings are introduced into the cooling cavities such that a threaded portion of the injection-molded PET moldings extends out of the cooling cavities, wherein at least one of the sensors is fixedly disposed in proximity to the injection molds such that all of the cooling cavities must pass by the at least one sensor so as to check for a position in the row, wherein the sensor monitoring takes place such that the threaded portions must move to and past the at least one sensor so as to recognize the error, wherein the error includes either an absence of the injection-molded PET molding or a retention of the injection molded PET molding, wherein in a case of an irregularity a safety intervention will be initiated.

* * * * *

UNITED STATES PATENT AND TRADEMARK OFFICE
CERTIFICATE OF CORRECTION

PATENT NO. : 7,250,130 B2 Page 1 of 1
APPLICATION NO. : 10/504928
DATED : July 31, 2007
INVENTOR(S) : Weinmann et al.

It is certified that error appears in the above-identified patent and that said Letters Patent is hereby corrected as shown below:

Claim 6, col. 9, line 54, "casting molds" should read --injection molds--.

Claim 14, col. 10, line 45, "casting mold" should read --injection molds--.

Signed and Sealed this

Twenty-seventh Day of November, 2007

JON W. DUDAS
*Director of the United States Patent and Trademark Office*